United States Patent
Murata

(10) Patent No.: US 7,161,627 B2
(45) Date of Patent: Jan. 9, 2007

(54) APPARATUS AND METHOD OF REGISTRATION CORRECTION FOR VIDEO SIGNAL PROCESSOR AND A TELEVISION CAMERA HAVING REGISTRATION CORRECTING FUNCTION

(75) Inventor: Nobuo Murata, Musashino (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 599 days.

(21) Appl. No.: 10/212,751

(22) Filed: Aug. 7, 2002

(65) Prior Publication Data
US 2003/0034984 A1    Feb. 20, 2003

(30) Foreign Application Priority Data
Aug. 10, 2001    (JP) ............... 2001-244483

(51) Int. Cl.
H04N 9/93    (2006.01)
H04N 3/26    (2006.01)
(52) U.S. Cl. ............... 348/263; 348/745
(58) Field of Classification Search ........... 348/263, 348/745
See application file for complete search history.

(56) References Cited

U.S. PATENT DOCUMENTS

| | | | | |
|---|---|---|---|---|
| 4,503,456 A | * | 3/1985 | Nakamura et al. | 348/263 |
| 4,679,084 A | * | 7/1987 | Topper et al. | 348/559 |
| 4,835,594 A | * | 5/1989 | Kihara | 348/263 |
| 5,150,957 A | * | 9/1992 | Walker et al. | 386/130 |
| 5,353,056 A | * | 10/1994 | Westerink et al. | 348/263 |
| 5,453,840 A | * | 9/1995 | Parker et al. | 356/400 |
| 6,870,564 B1 | * | 3/2005 | Burns | 348/263 |

* cited by examiner

*Primary Examiner*—Ngoc-Yen Vu
*Assistant Examiner*—Nicholas G Giles
(74) *Attorney, Agent, or Firm*—Mattingly, Stanger, Malur & Brundidge, P.C.

(57) ABSTRACT

A registration correction apparatus having interpolation circuits. The interpolation circuits receives digital sampled pixel signals from at least one channel of a plurality of color signal channels. The digital sampled pixel signals have been obtained by sampling consecutive pixel signals. Each of the interpolation circuits generates a digital pixel signal in a desired position between adjacent two of the digital sampled pixel signals by interpolation processing. The desired position between the two adjacent digital sampled pixel signals is set in accordance with a registration discrepancy among the plurality of color signal channels by a control circuit.

21 Claims, 7 Drawing Sheets

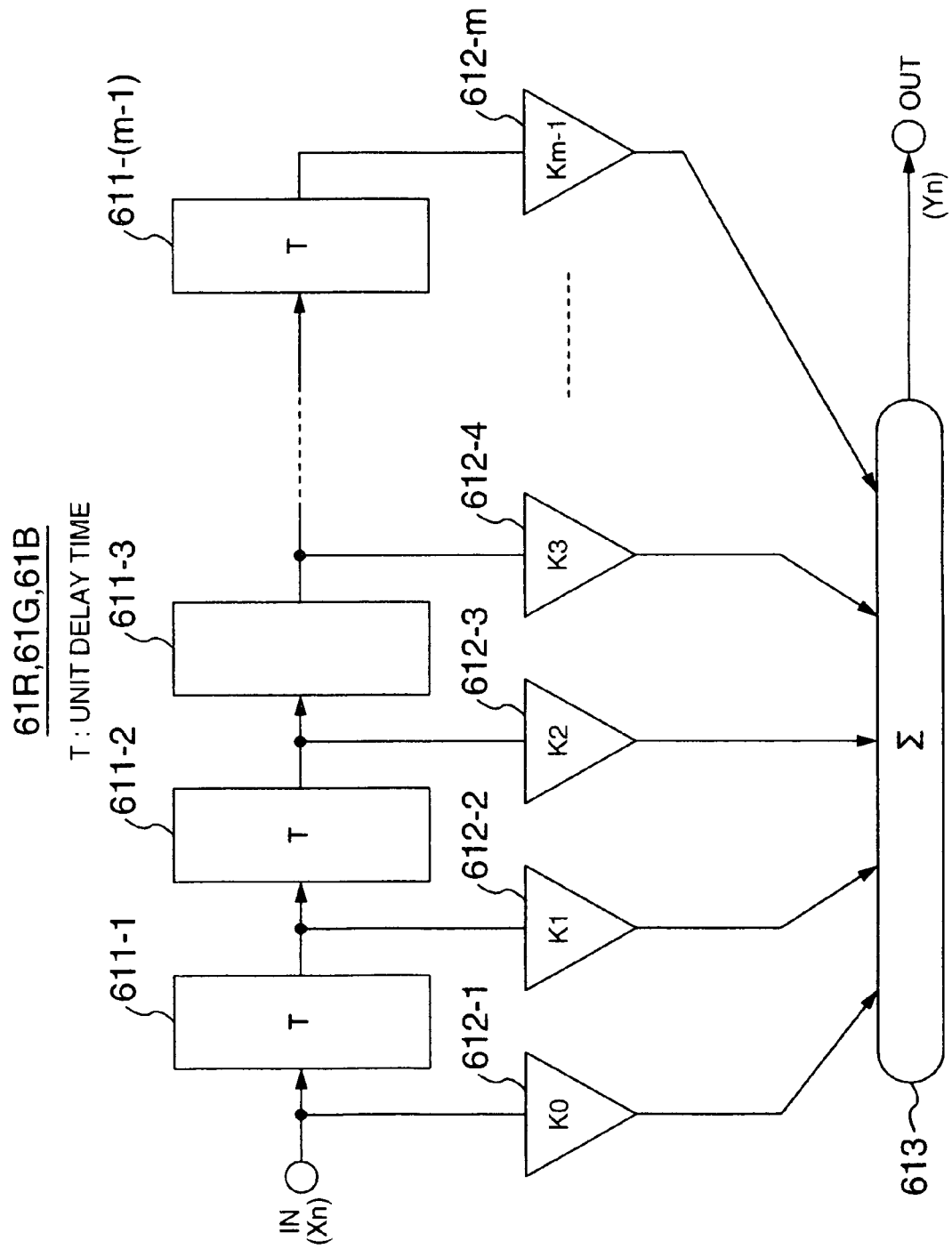

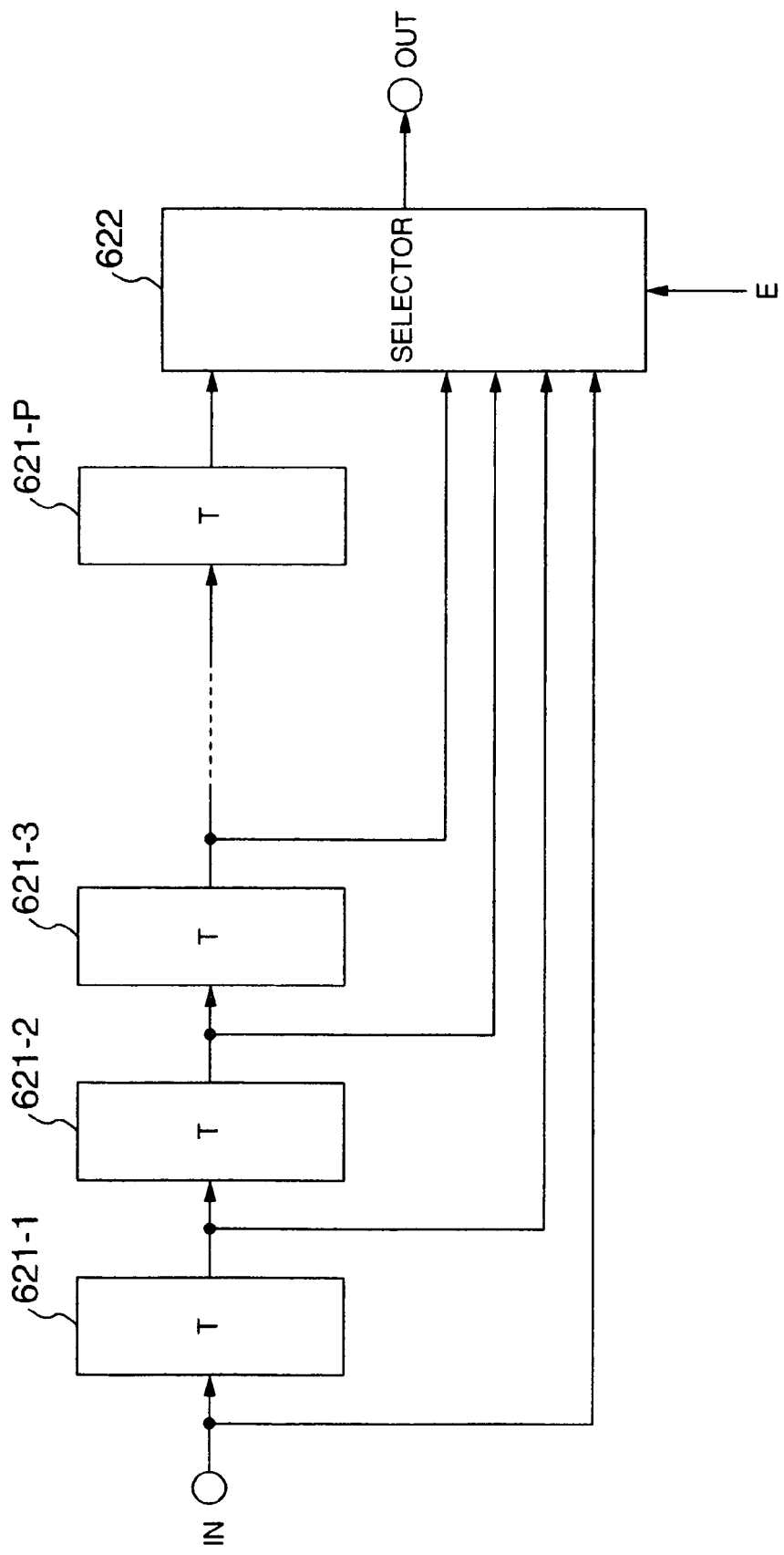

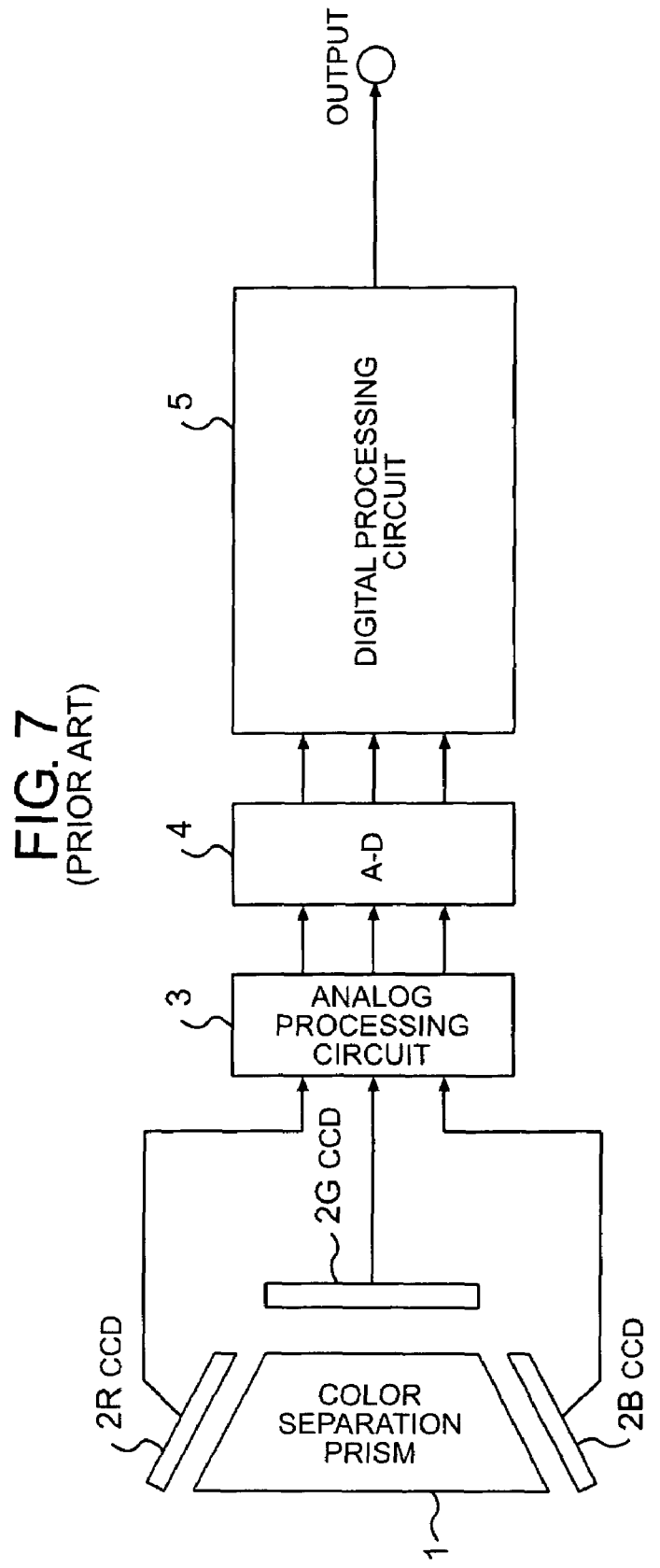

APPARATUS AND METHOD OF REGISTRATION CORRECTION FOR VIDEO SIGNAL PROCESSOR AND A TELEVISION CAMERA HAVING REGISTRATION CORRECTING FUNCTION

BACKGROUND OF THE INVENTION

The present invention relates to a signal processing technique for a video signal processor including a color television camera, and particularly relates to an apparatus and a method of registration discrepancy correction suitable to a television camera used in a system in which image pickup elements are joined to a color separation optical system, and a television camera having a registration correcting function.

So-called three-chip color television cameras are hitherto prevailed as television cameras used for applications such as broadcasting applications in which comparatively high performance specifications are required. The three-chip color television cameras adopt a system in which an incident image is separated into images of the three primary colors R (Red), G (Green) and B (Blue) by a prism, and the color images are transformed into electric signals by solid state image pickup elements such as CCDs respectively.

Here, FIG. 7 shows an example of such a three-chip television camera. In FIG. 7, an image obtained by a not-shown optical lens system is separated into images of the three primary colors R, G and B by a color separation prism 1. The color images are transformed into electric signals by solid state image pickup elements 2R, 2G and 2B of their corresponding color channels, respectively, and then supplied to an analog signal processing circuit 3.

Then, the electric signals subjected to processing such as amplification by the analog signal processing circuit 3 are converted into digital signals by an AD conversion circuit 4. Next, the digital signals are subjected to processes such as gamma correction, edge enhancement, and so on, by a digital signal processing circuit 5 so as to be formed as output signals.

Such a three-chip television camera typically adopts a system in which the respective solid state image pickup elements 2R, 2G and 2B are semi-permanently fixedly stuck to the color separation prism 1 by an adhesive agent or the like. In this case, however, when optical alignment of the three solid state image pickup elements is carried out inaccurately, the positions of the elements cannot be re-adjusted to eliminate the displacement.

This results in so-called registration discrepancy in which images based on three color signals are not perfectly matched to one another when they are reproduced. The registration discrepancy leads to the deterioration of the resolution, the generation of false color signals, and so on. Thus, the image quality of a reproduced image is deteriorated on a large scale. Therefore, high accuracy is required for positioning the solid state image pickup elements when they are stuck to the prism.

In addition, the high-definition television age has opened in recent years so that the number of pixels in image pickup elements has increased dramatically. Therefore, the required accuracy of positioning is extremely high so that advanced technology and extensive time are required for the positioning work. In addition, since even slight deformation gives a great influence, it is extremely difficult to keep the performance after manufacturing.

As for horizontal positioning of image pickup elements, delay properties differing among the R, G and B color channels in a video signal circuit system or a signal transmission system such as signal lines also cause a registration discrepancy. Accordingly, the horizontal positioning has to be carried out with higher precision in consideration of such a registration discrepancy. Thus, it is more and more difficult to obtain high precision.

Therefore, a method in which suppression of registration discrepancies depends on not only the assembling accuracy of an optical system but also electric correction based on processing of image signals has been hitherto known. For example, in the prior art, there is a method as follows. That is, delay times or phases among respective color signals are adjusted by analog delay lines before the color signals are AD-converted. Thus, registration discrepancies are corrected.

The aforementioned prior-art technique gives no consideration to the influence of use of the analog delay lines. Thus, there are problems that the cost increases and the performance cannot be kept. That is, since it is necessary to add the analog delay lines, extra wiring and extra work are required so as to cause a lot of labor and time. Thus, the cost increases. In addition, since the delay properties using the analog delay lines are fixed, a variety of discrepancies cannot be dealt with flexibly, and a variety of properties cannot be dealt with, either. Thus, there also arises a problem that the performance cannot be kept.

Japanese Patent No. 2744577 issued to Yamamoto et al discloses a method in which, when a color signal is read from each of CCD elements of the colors R, G and B, the phase of a reference horizontal transfer pulse is adjusted on the basis of a registration error by a delay circuit so as to correct the registration. According to this method, since a plurality of horizontal transfer pulses having different frequencies are produced, the circuit configuration as a whole becomes complicated, and the adjustment is also troublesome.

U.S. Pat. No. 5,113,247 issued to Akiyama et al and JP-A-6-303622 disclose that a two-dimensional filter is used chiefly to eliminate color shift caused by lens aberration. The correction of chromatic aberration using the two-dimensional filter increases the circuit scale so that the cost increases.

SUMMARY OF THE INVENTION

An object of the present invention is to provide an apparatus and a method of registration correction for a video signal processor in which registration matching can be obtained with sufficient accuracy and the set registration matching state can be kept easily, and to provide a television camera having a registration correcting function.

In order to attain the foregoing object, the registration correction apparatus according to the present invention has interpolation circuits. Each of the interpolation circuits receives digital sampled pixel signals from at least one channel of a plurality of color signal channels. The digital sampled pixel signals have been obtained by sampling consecutive pixel signals. The interpolation circuit generates a digital pixel signal in a desired position between adjacent two of the digital sampled pixel signals by interpolation processing. The desired position between the two adjacent digital sampled pixel signals is set in accordance with a registration discrepancy among the plurality of color signal channels by a control circuit.

The signal located between the adjacent pixel signals and obtained by the interpolation circuit is a signal delayed by time corresponding to the registration discrepancy. Thus, horizontal registration discrepancies can be corrected with temporal accuracy shorter than the interval between the adjacent pixels, that is, the sample time. The registration correction apparatus according to the present invention can easily and accurately correct horizontal registration discrepancies caused by disposition errors of a plurality of solid state image pickup elements on a color separation prism and horizontal registration discrepancies caused by delay time differences among signal paths of a plurality of color signal channels in a video signal circuit.

Further, in the registration correction apparatus according to an embodiment of the present invention, an FIR filter receiving the digital sampled signals as inputs and having a predetermined number of taps is used as each of the interpolation circuits. Values of tap coefficients of the FIR filter are set in accordance with the registration discrepancy. Thus, the output of the FIR filter becomes the digital pixel signal obtained by interpolation processing.

Further, the registration correction apparatus according to an embodiment of the present invention includes variable delay circuits as well as the interpolation circuits. Each of the variable delay circuits varies a delay time from zero to a predetermined time step by step by unit of one sample time. Registration correction (rough adjustment) for a sample time unit not shorter than one sample time is carried out by the variable delay circuits while registration correction (fine adjustment) for delay time shorter than one sample time is carried out by the interpolation circuits. The rough adjustment and the fine adjustment are combined suitably so that high-accuracy registration correction can be achieved easily.

Other objects, features and advantages of the invention will become apparent from the following description of the embodiments of the invention taken in conjunction with the accompanying drawings.

BRIEF DESCRIPTION OF THE DRAWINGS

FIG. 5 is a block diagram showing an embodiment of an interpolation processing circuit of the registration correction apparatus according to the present invention;

FIG. 6 is a block diagram showing an embodiment of a variable delay circuit of the registration correction apparatus according to the present invention; and FIG. 7 is a block diagram showing an example of a color television camera in the prior art.

DESCRIPTION OF THE EMBODIMENTS

Figure 1:
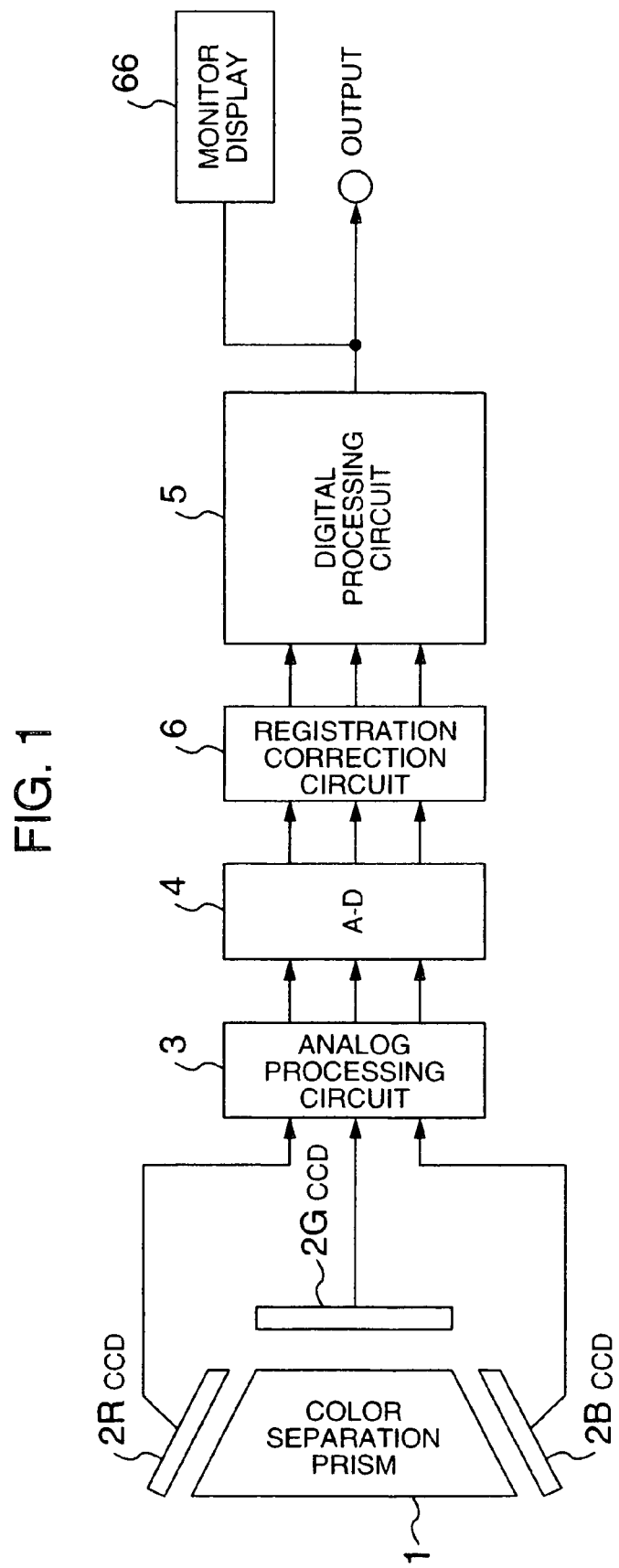
FIG. 1 is a block diagram showing an embodiment of a registration correction apparatus of a television camera according to the present invention.

A registration correction apparatus for a television camera according to the present invention will be described below in detail along its embodiments shown in the drawings.

FIG. 1 shows an embodiment of the present invention. In FIG. 1, the reference numeral 6 represents a registration correction circuit, and the other parts are arranged in the same manner as those in the prior art described with reference to FIG. 7. That is, the registration correction apparatus has a color separation prism 1, solid state image pickup elements 2R, 2G and 2B for respective color channels, an analog signal processing circuit 3, an A/D conversion circuit 4, and a digital signal processing circuit 5, and the registration correction apparatus is designed so that an image signal based on an image of a subject to be picked up can be obtained as an output signal from the digital signal processing circuit 5.

Here, the registration correction circuit 6 is peculiar to this embodiment. This embodiment is different from the prior art in that the registration correction circuit 6 peculiar to this embodiment is provided between the A/D conversion circuit 4 and the digital signal processing circuit 5.

Figure 2:
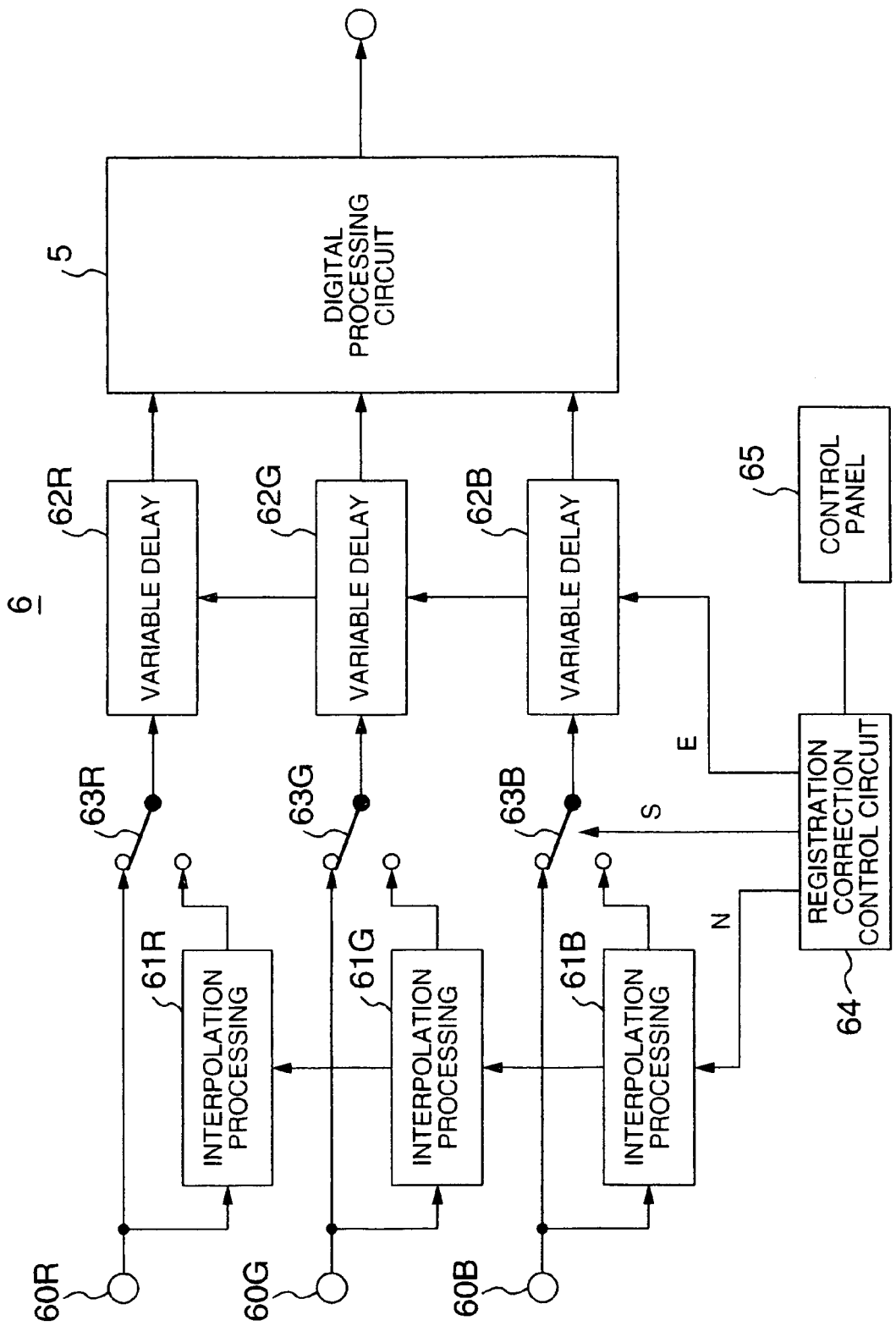
FIG. 2 is a block diagram showing in detail a registration correction circuit according to an embodiment of the present invention.

Then, the registration correction circuit 6 is constituted by interpolation processing circuits 61R, 61G and 61B, variable delay circuits 62R, 62G and 62B, changeover switch circuits 63R, 63G and 63B, and a registration correction control circuit 64 as shown in FIG. 2.

Here, first, the interpolation processing circuits 61R, 61G and 61B can interpolate phase shifts by time unit shorter than an interval between adjacent pixels in their corresponding R, G and B signal channels respectively. Thus, each of the interpolation processing circuits 61R, 61G and 61B has a function to generate data with a time delay corresponding to the phase shift (registration discrepancy). Here, the interval between adjacent pixels means a time (phase) interval between signals of adjacent pixels in a horizontal sequence of pixels. When signals of each pixel output from the solid state image pickup elements 2R, 2G and 2B such as CCDs respectively are converted into digital signals by the A/D conversion circuit 4, digital video (color) signals of each pixel of the CCDs are obtained at every sample time. That is, the interval between adjacent pixels corresponds to one sample time of A/D-converted digital signals. The registration correction apparatus according to the present invention can perform registration correction with time (phase) accuracy shorter than this one sample time.

Next, the variable delay circuits 62R, 62G and 62B have a function as follows. That is, each of the variable delay circuits 62R, 62G and 62B operates at delay time set individually by time unit corresponding to the interval between adjacent pixels likewise in the corresponding signal channel, so as to output an input signal after the set delay time has passed. Thus, the variable delay circuits 62R, 62G and 62B generate data with delay time required for adjusting the phase shifts step by step by the time unit corresponding to the interval between adjacent pixels.

On the other hand, the change-over switch circuits 63R, 63G and 63B have a function as follows. That is, the change-over switch circuits 63R, 63G and 63B switch the inputs of the variable delay circuits 62R, 62G and 62B in the respective channels to the outputs of the interpolation processing circuits 61R, 61G and 61B respectively. Alternatively, the change-over switch circuits 63R, 63G and 63B bypass the interpolation processing circuits 61R, 61G and 61B and switch the inputs of the variable delay circuits 62R, 62G and 62B to original signals input from the input terminals R, G and B respectively.

Further, the registration correction control circuit 64 has a function as follows. That is, the registration correction control circuit 64 supplies predetermined control signals N, S and E to the interpolation processing circuits 61R, 61G and 61B, the variable delay circuits 62R, 62G and 62B and the change-over switch circuits 63R, 63G and 63B respectively. Thus, processing required for correcting the registration discrepancies is allowed to be executed.

Then, to this end, though not shown, the registration correction control circuit 64 is provided with a given input unit such as a keyboard or a control panel 65 as a man-machine interface for the work of adjustment. Thus, an operator can give a predetermined operating input at the time of registration matching.

Here, description will be made further in detail on the interpolation processing circuits 61R, 61G and 61B and the variable delay circuits 62R, 62G and 62B. First, the principle on which phase shift interpolated signals are generated with resolving power smaller than the interval between adjacent pixels by the interpolation processing circuits 61R, 61G and 61B will be described along one channel of the R, G and B color signal channels.

Figure 4:
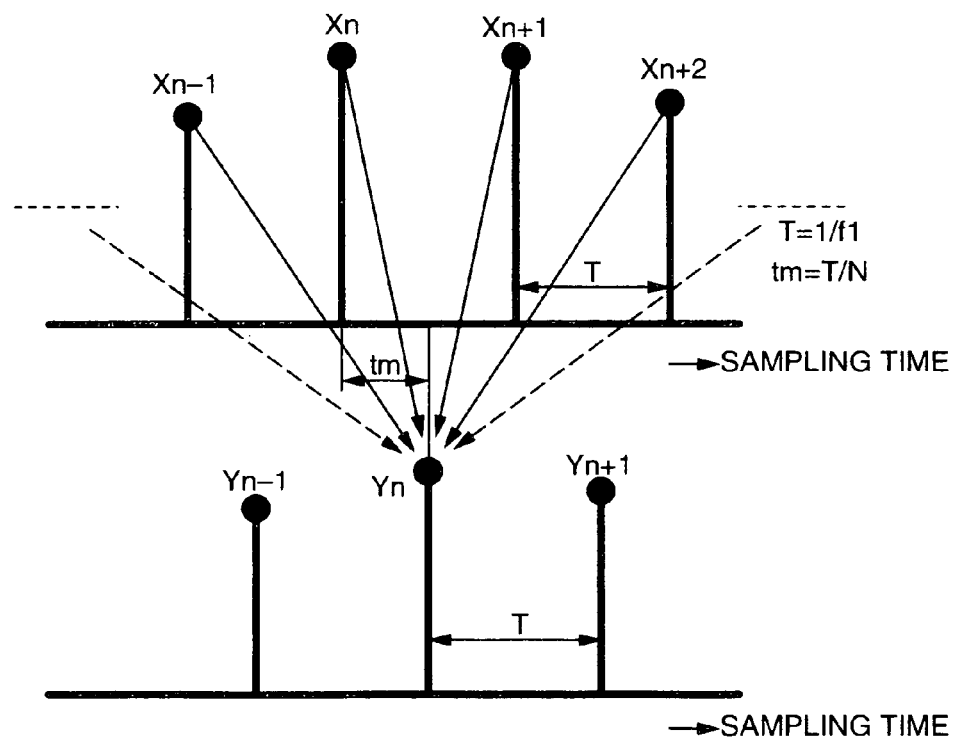
FIG. 4 is a diagram for explaining the principle on which interpolated signals are generated in an embodiment of the registration correction apparatus according to the present invention.

Assume that a registration discrepancy of a color signal to be corrected with respect to another color signal as a reference is equal to a phase shift tm smaller than the interval between adjacent pixels. In this case, it is necessary to generate a correction signal for the delay time corresponding to the phase shift tm from real sampled signals. In the registration correction apparatus according to the present invention, such a registration correction signal is generated by interpolation processing using digital sampled pixel signals on opposite sides of the correction signal for the delay time corresponding to the phase shift tm and digital sampled pixel signals in the vicinities of the first-mentioned digital sampled pixel signals. The principle on which the interpolated signal is generated at that time will be described. For example, FIG. 4 shows a part of a stream of consecutive discrete sampled signals output from the A/D conversion circuit 4 in one of the color signal channels. As shown in FIG. 4, a pixel data sequence (Yn)= . . . , Yn−1, Yn, Yn+1, Yn+2, . . . appearing with a time shift tm corresponding to a registration discrepancy shorter than the interval of adjacent pixels with respect to an original pixel data sequence (Xn) is obtained from a plurality of pieces of data . . . , Xn−1, Xn, Xn+1, Xn+2, . . . of the pixel data sequence (Xn) by interpolation processing. A method for obtaining a specified piece Yn of data in the pixel data sequence (Yn) by interpolation will be described below.

Then, a pixel data sequence (Yn) with a phase shifted by the time tm from a pixel data sequence (Xn) which is a discrete signal sequence at a sampling frequency f1 (sampling period T=1/f1) is obtained by interpolation processing of the pixel data sequence (Xn). This interpolation processing can be implemented by a digital filter which will be described later. On the assumption that a numeric value m designates the order of the filter, when a numeric value sequence within a predetermined integer range including a numeric value n is taken from 0 to m−1 by a parameter i, the interpolated data (Yn) is generally obtained by the following expressions (1) and (1'). Incidentally, the numeric values n and m designate positive integers larger than 2.

$$Yn = \sum_{i=0}^{m-1} x_{n-(m-1)/2+i} \cdot K_i \quad (1)$$
(when $m$ is an odd number)

$$Yn = \sum_{i=0}^{m-1} x_{n-m/2+i} \cdot K_i$$
(when $m$ is an even number)

$$K_i = K(tm + (i - (m+1)/2) \cdot T) \quad (1')$$
(when $m$ is an odd number)

$$K_i = K(tm + (i - (m-2)/2) \cdot T)$$
(when $m$ is an even number)

Here, tm designates the phase difference between a sample point Yn (corresponding to the data Yn in FIG. 4) and data Xn the closest to the data Yn, expressed by time on the assumption of tm≧0 in this example. Next, K(t) is an interpolation function, adopting a function expressed by the following expression (2) on the assumption that t is a time parameter.

$$K(t) = \mathrm{Sin}(\pi \cdot f1 \cdot t)/\pi \cdot f1 \cdot t \quad (2)$$

Here, this expression (2) expresses an impulse response of an ideal low pass filter typically having a frequency band half as wide as the frequency f1, called an Sinc function.

Incidentally, for the range of the data sequence shown in FIG. 4, the aforementioned expression (1) can be expressed by the following expression (3) when $m$ is fixed to be 4 and the range of $i$ is set to be from n−1 to n+2.

$$Yn = \sum_{i=n-1}^{n+2} X_i \cdot K(tm + (i-n)T) \quad (3)$$

Then, to anticipate data Yn from a finite number (K) of data sequence (Xn) and obtain the data Yn by interpolation as shown in this expression (3), it is proved that a circuit called an m-order FIR (Finite Impulse Response) filter may be used as shown in FIG. 5.

Therefore, in this embodiment, each of the interpolation processing circuits 61R, 61G and 61B is constituted by the circuit shown in FIG. 5. As shown in the drawing, this circuit is constituted by (m−1) unit delay elements 611-1 to 611-(m−1) each having delay time equal to the sampling period T and connected in series, m multipliers 612-1 to 612-m, and an integrator 613 for integrating the outputs of these multipliers.

Here, coefficients K0 to Km−1 made of numeric values ranging from 0 to 1 have a function. That is, the coefficients K0 to Km−1 are set in the multipliers 612-1 to 612-m respectively. Thus, the multipliers 612-1 to 612-m weight input data and output data of the unit delay elements 611-1 to 611-(m−1) respectively, and supply the weighted data to the integrator 613.

The coefficients K0 to Km−1 at this time are called filter coefficients or tap coefficients, which are values obtained in the aforementioned expression (2). When the respective values of the coefficients K0 to Km−1 are varied in accordance with the time shift tm, an interpolated signal in accordance with the time shift tm shown in FIG. 4 can be obtained so that a data sequence (Yn) having desired delay time shorter than the interval between adjacent pixels can be obtained. Thus, registration discrepancies shorter than the interval between adjacent pixels (one sampling interval T) can be matched.

At this time, as is apparent from the expression (2), no matter how large the phase shift is on this occasion, the phase shift can be dealt with theoretically by coefficients ki obtained by substituting the value corresponding to the phase shift for the time tm in the expression (2). Thus, the value of the time tm can be dealt with consecutively.

Next, description will be made on the variable delay circuits 62R, 62G and 62B. As shown in FIG. 6, each of the variable delay circuits 62R, 62G and 62B can be constituted easily by unit delay elements 621-1 to 621-p (p is a positive integer) each having delay time T and connected in series from input to output, and a selector circuit 622 for selecting and outputting either input data or output data of the unit delay elements 621-1 to 621-0.

Accordingly, when the selector circuit 622 selects required data, a data sequence (Yn) with desired delay time varying at intervals for every pixel can be obtained for a data sequence (Xn). Thus, registration discrepancies from one corresponding to one pixel to one corresponding to p pixels can be matched for every pixel.

Therefore, next, description will be made on registration matching in the television camera according to the embodiment of FIG. 1 having the registration correction circuit 6 of FIG. 2.

Registration matching is generally carried out by an operator who is monitoring a reproduced image on a display. Therefore, first, an image signal output from the digital processing circuit 5 is supplied to a predetermined monitor display 66 so that an image is displayed thereon. Then, the predetermined input unit such as a keyboard or the control panel 65 provided in the registration correction control circuit 64 is operated to carry out registration matching.

At this time, the change-over switch circuits 63R, 63G and 63B are, at first, switched to upper contact points in FIG. 2 in accordance with the control signal S. In this state, an operator observes the registration discrepancies of the respective colors R, G and B of the image displayed on the monitor display 66. One example of the observing method of the registration discrepancies is as follows. A pattern having a very high contrast of bright and dark portions is imaged by a camera, and the operator checks existence or absence of a chromatic aberration which is possible at the border of the bright and dark portions and examines the degree of the chromatic aberration. While the operator checks and examines the image on the monitor display in such manner, the operator operates the control panel 65 to control the value of the control signal E outputted from the registration correction control circuit 64. The delay quantities of the variable delay circuits 62R, 62G and 62B are selectively changed over individually according to the control signal E. The value of the control signal E is so controlled that the shift value varied with the selection is minimized on the monitor display 66. In this case, for example, by use of a signal in the R channel as a reference signal, the registration discrepancies of color signals in the G channel and the B channel with respect to the signal in the R channel may be corrected by adjusting the delay quantities of the variable delay circuits 62G and 62B. In this case, the color signal channel used as reference may be any one of the R, G and B channels. Incidentally, the registration correction control circuit 64 is implemented by a microcomputer and a memory unit. A program for generating the control signals N, S and E in accordance with an input signal from the control panel 65 is incorporated in the microcomputer.

Here, when adjustment can be achieved to make registration satisfactory among respective images of R, G and B, the registration may be fixed as it is. Then, the registration matching may be terminated.

However, the registration adjustment at this time is carried out by varying the delay quantities step by step by unit of the interval (T) between adjacent pixels. Therefore, the registration adjustment corresponds to so-called rough adjustment, which can indeed achieve correct matching for a discrepancy corresponding to a delay time T and discrepancies corresponding to delay times 2T, 3T, ... PT which are integral multiples of the time T, but can merely achieve rough registration matching for discrepancies corresponding to delay times which are not integer multiples but fractional multiples.

In addition, in fact, the probability that the registration discrepancy is exactly equal to an integer multiple of the interval between adjacent pixels is considerably low.

Therefore, when the registration discrepancies cannot be corrected perfectly only by the variable delay circuits, the change-over switch circuits 63R, 63G and 63B are subsequently switched to the lower contact points in FIG. 2, and the operator operates the control panel 65 to control the value of the control signal N outputted from the registration correction control circuit 64. According to the control signal N, delay quantities tm of the interpolation processing circuits 61R, 61G and 61B are varied individually by the control signal E this time. Thus, an accurate registration matching state, in which no registration discrepancies are observed on the monitor display, can be obtained soon.

The delay quantities based on the interpolation processing circuits 61R, 61G and 61B at this time can be adjusted to be substantially consecutive values shorter than the interval between adjacent pixels in accordance with the control signal N. Thus, the adjustment corresponds to so-called fine adjustment, which can therefore obtain sufficiently correct registration matching finally.

When registration matching is completed thus, the conditions of the control signals N, S and E output from the registration correction control circuit 64 at this time are stored in a not-shown given memory (nonvolatile memory) respectively.

Then, after that, as soon as the television camera is operated, the registration correction control circuit 64 reads out the control signals N, S and E stored in the memory, and supplies the read control signals N, S and E to the interpolation processing circuits 61R, 61G and 61B, the variable delay circuits 62R, 62G and 62B, and the change-over switch circuits 63R, 63G and 63B respectively.

According to the control signals N, S, and E read out and supplied to, the R, G and B color signals to which the accurate registration correction is made are inputted to the digital signal processing circuit 5. The inputted corrected signals are subjected to gamma correction and edge enhancement processing. After that process, the R, G, and B color signals are outputted in synchronism with each other with keeping registration correction in effect.

Thus, according to this embodiment, registration matching can be achieved easily and sufficiently accurately only by the operation of the input unit 65. In addition, once the registration matching has been achieved, color image signals with no fear of deterioration in resolution or lowering of image quality caused by generation of false color signals can be obtained surely only by bringing the television camera into an operation state.

In addition, according to this embodiment, even if a registration discrepancy appears for some reason after the registration matching has been carried out, registration matching can be achieved again only by the operation of the input unit 65 to control values of the control signals N, S, and E outputted from the registration correction control circuit 64. It is therefore possible to keep the performance of the television camera easily.

Next, description will be made on another embodiment of the present invention.

In the embodiment described previously, the coefficients to be set for the multipliers 612-1 to 612-m of the respective interpolation processing circuits 61R, 61G and 61B can be made controllable so that horizontal registration discrepancies can be corrected theoretically with any accuracy. However, some television cameras do not require such high registration accuracy in practical use.

Figure 3:
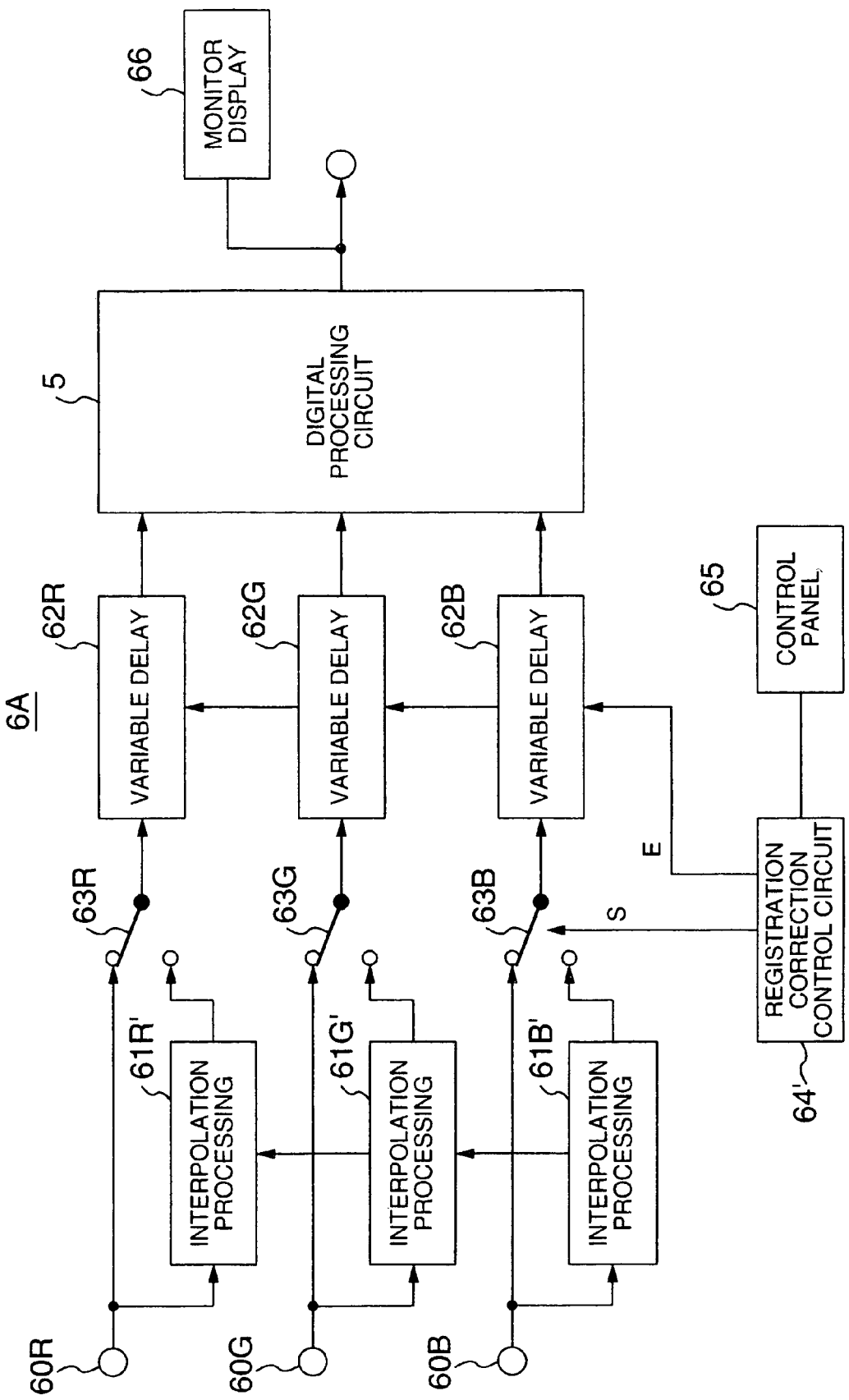
FIG. 3 is a block diagram showing in detail another embodiment of the registration correction circuit according to the present invention.

Description will be therefore made below on another embodiment of the present invention which supports such a case. FIG. 3 shows a registration correction circuit 6A in this embodiment, having the same configuration as that in the embodiment described with reference to FIG. 2, except the registration correction circuit 6A. When the registration correction circuit 6A is applied to a television camera, the registration correction circuit 6 in FIG. 1 is merely replaced by the registration correction circuit 6A.

Then, the registration correction circuit 6A in FIG. 3 differs from the registration correction circuit 6 shown in FIG. 2 as follows. That is, no control signal N is supplied from the registration correction control circuit 64 to the respective interpolation processing circuits 61R, 61G and 61B, but delay times tm of interpolation processing circuits 61R', 61G' and 61B' are fixed.

Here, the delay times tm based on the interpolation processing circuits 61R', 61G' and 61B' at this time are, for example, set to be the time T/2. Thus, fine adjustment by ½ of the interval between adjacent pixels can be obtained.

As a result, according to the embodiment of FIG. 3, the accuracy of registration matching becomes ½ of the interval between adjacent pixels, while the configurations of the interpolation processing circuits 61R, 61G and 61B are simplified. Thus, there is an effect that the cost can be reduced.

Although delay means of an interpolation processing circuit and delay means of a variable delay circuit are provided for every channel of the R, G and B channels in the embodiments described previously, it will often go well in practice if registration matching is achieved relatively among the R, G and B channels. Accordingly, similar effect can be obtained even if no delay means or a constant fixed delay is provided for one specified channel, for example, for the G channel while delay means is provided for the other channels, for example, for the R and B channels.

Although the above embodiments of the present invention were described on the case of a three-chip television camera having three solid state image pickup elements, the registration correction apparatus according to the present invention is not limited to the three-chip type but is also applicable to television cameras using four solid state image pickup elements. In addition, the present invention can support not only registration discrepancies based on spatial errors caused by inaccurate disposition of solid state image pickup elements but also registration discrepancies based on electric errors caused by differences in delay quantity among a plurality of different color signal channels on signal transmission lines in a video signal circuit. Accordingly, the registration correction apparatus according to the present invention can be used for registration correction in a video signal processor other than a television camera.

In addition, when registration correction is required only for a specified color signal channel even though there are a plurality of different color signal channels, a registration correction apparatus using an interpolation processing circuit and a variable delay circuit according to the present invention may be provided only for the specified color signal channel.

According to the present invention, registration matching can be achieved with high accuracy and easily regardless of the conditions in which image pickup elements are joined to a color separation optical system. As a result, high accuracy is not required for the joint of the image pickup elements to the color separation optical system such as a prism. Thus, the manufacturing cost of a television camera can be reduced greatly and easily.

In addition, according to the present invention, registration matching can be carried out repeatedly easily. As a result, high performance can be kept for a long term easily.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A registration correction apparatus in a video signal processor, to which color signals having registration discrepancy are supplied, comprising:
   input terminals for supplying said color signals;
   a registration correction unit coupled with said input terminals, for correcting said color signals having registration discrepancy,
   wherein said registration correction unit includes a plurality of variable delay units for delaying said color signals as an interval between adjacent pixels or integer multiple of said interval, a plurality of interpolation processing units for generating interpolated signals based on said color signals from said adjacent pixels in response to delay times of said color signals if said times of said color signals shorter than said interval and a plurality of switch units for changing connections of said input terminals or said interpolation processing units with said variable delay units; and
   a control unit, coupled with said switch units, said variable delay units and said interpolation processing units, for controlling said switch units, said variable delay units and said interpolation processing units so as to correct said registration discrepancy.

2. A registration correction apparatus according to claim 1, wherein said variable delay units are a plurality of variable delay units corresponding to said color signals, respectively; and
   wherein said interpolation processing units are a plurality of interpolation processing circuits corresponding to said color signals, respectively.

3. A registration correction apparatus according to claim 1, wherein each of said interpolation processing units includes an FIR filter with a predetermined number of taps, said FIR filter receiving a sampled color signal, and said control unit controls tap coefficients of said FIR filter in accordance with said control values to adjust registration discrepancy.

4. A registration correction apparatus according to claim 2, wherein said color signals are R, G and B color signals, said R, G and B color signals supply to a plurality of said interpolation processing units, respectively, and said control unit controls said interpolation processing units so as to adjust said registration discrepancy with reference to any one of said R, G and B color signals.

5. A registration correction apparatus according to claim 2, wherein said color signals are R, G and B color signals, two color signals of said R, G and B color signals are supplied to said interpolation processing units and said control unit controls said interpolation processing units so as to adjust said registration discrepancy with reference to the rest of said color signals which is not supplied to said interpolation processing units.

6. A registration correction apparatus according to claim 2, wherein said color signals are output signals from a plurality of said solid-state image pick-up elements for receiving light passing through a color separation optical system.

7. A registration correction apparatus according to claim 2, wherein each of said switch units selects a connection of either one of said input terminals or either one of the outputs of said interpolation processing units with said variable delay units, and said control unit controls said switch units so as to couple either one of said input terminals or either one of the outputs of said interpolation circuits with said variable delay units.

8. A registration correction apparatus according to claim 7, wherein each of said interpolation processing units includes an FIR filter with a predetermined number of taps, said FIR filter receiving a sampled color signal, and said control unit controls tap coefficients of said FIR filter in accordance with said control values to adjust registration discrepancy.

9. A registration correction apparatus according to claim 7, wherein said color signals are R, G and B color signals, said R, G and B color signals supply to a plurality of said interpolation processing units, respectively, and said control unit controls said interpolation processing units so as to adjust said registration discrepancy with reference to any one of said R, G and B color signals.

10. A registration correction apparatus according to claim 7, wherein said color signals are R, G and B color signals, two color signals of said R, G and B color signals supply to said interpolation processing units and said control unit controls said interpolation processing units so as to adjust said registration discrepancy with reference to the rest of said color signals which is not supplied to said interpolation processing units.

11. A registration correction apparatus according to claim 7, wherein said color signals are output signals from a plurality of said solid-state image pick-up elements for receiving light passing through a color separation optical system.

12. A television camera apparatus comprising;
a color separation optical unit for separating an incident image into a plurality of color images;
a plurality of solid-state image pick-up elements for receiving said color images, respectively, and outputting color signals corresponding to said color images;
an A/D conversion unit, coupled with said image pick-up elements, for converting said color signals from said image pick-up elements and generating digital sampled color signals;
a registration correction unit, coupled with said A/D conversion unit, for correcting said digital sampled color signals having registration discrepancy,
wherein said registration correction unit includes a plurality of variable delay units for delaying said color signals as an interval between adjacent pixels or integer multiple of said interval, a plurality of interpolation processing units for generating interpolated signals based on said color signals from said adjacent pixels in response to delay times of said color signals if said delay times of said color signals shorter than said interval and a plurality of switch units for changing connections of outputs of said A/D conversion unit or said interpolation processing units with said variable delay units;
a digital signal processing unit, coupled with said registration correction unit, for converting said digital sampled color signals into a transmission color signals;
a monitor, coupled with said digital signal processing unit, for displaying said transmission color signals;
an input control panel for inputting control values to adjust said registration discrepancy on said monitor; and
a control unit, coupled with said switch units, said variable delay units and said interpolation processing units, for controlling said switch units, said variable delay units and said interpolation processing units so as to correct said registration discrepancy displayed on said monitor based on said inputted control values from said input control panel.

13. A television camera apparatus according to claim 12, wherein said variable delay units are a plurality of variable delay circuits units corresponding to said digital sampled color signals, respectively, and
wherein said interpolation processing units are a plurality of interpolation processing circuits corresponding to said digital sampled color signals, respectively.

14. A television camera apparatus according to claim 13, wherein each of said interpolation processing units includes an FIR filter with a predetermined number of taps, said FIR filter receiving said digital sampled color signals, and said control unit controls tap coefficients of said FIR filter in accordance with said control values to adjust registration discrepancy.

15. A television camera apparatus according to claim 13, wherein said digital sampled color signals are R, G and B color signals, said R, G and B color signals are supplied to a plurality of said interpolation processing units, respectively, and said control unit controls said interpolation processing units so as to adjust said registration discrepancy with reference to any one of said R, G and B color signals.

16. A television camera apparatus according to claim 13, wherein said digital sampled color signals are R, G and B color signals, two color signals of said R, G and B color signals are supplied to said interpolation processing units and said control unit controls said interpolation processing units so as to adjust said registration discrepancy with reference to the rest of said color signals which is not supplied to said interpolation processing units.

17. A television camera apparatus according to claim 13, wherein each of said switch units selects a connection of either one of outputs of said A/D conversion unit or either one of the outputs of said interpolation processing units with said variable delay units, and said control unit controls said switch units so as to couple either one of said outputs of said A/D conversion unit or either one of the outputs of said interpolation processing units with said variable delay units.

18. A registration correction method for solid-state state image pickup elements in a video signal processor having a registration correction unit including a plurality of variable delay units and a plurality of interpolation processing units, to which color signals having registration discrepancy are supplied, comprising the steps of:
supplying said color signals to input terminals of said registration correction unit;
correcting said color signals having registration discrepancy,
wherein said step of correcting includes the steps of:

controlling said variable delay units to delay said color signals as an interval between adjacent pixels or integer multiple of said interval if said color signals are shifted more than said interval, controlling said interpolation processing units to generate interpolated signals based on said color signals from said adjacent pixels if delay times of said color signals are shorter than said interval and if said color signals are shifted to be shorter than said interval, and controlling a switch unit to switch said variable delay units and said interpolation processing units so as to correct said registration discrepancy.

19. A registration correction method according to claim 18, wherein said registration correction unit comprises:

a plurality of variable delay units corresponding to said color signals, respectively, and a plurality of interpolation processing units corresponding to said color signals, respectively.

20. A registration correction method according to claim 19, wherein each of said interpolation processing units includes an FIR filter with a predetermined number of taps, said FIR filter receiving said sampled color signal, and the step of:

controlling said interpolation processing units is the step of controlling tap coefficients of said FIR filter in accordance with said registration discrepancy.

21. A registration correction apparatus for solid-state image pickup elements in a video signal processor, to which color signals having registration discrepancy are supplied, comprising:

a plurality of input terminals for supplying said color signal;

a registration correction unit, coupled to said input terminals, for correcting said color signals having registration discrepancy, wherein said registration correction unit includes a plurality of variable delay units for delaying said color signals as an interval between adjacent pixels or integral multiple of said interval, a plurality of interpolation processing units for generating interpolated signals based on said color signals from said adjacent pixels in response to delay times of said color signals if said delay times of said color signals are shorter than said interval and a plurality of switch units for changing connections of said input terminals or said interpolation processing units with said variable delay units;

a monitor, coupled with said registration correction unit, for displaying said color signals;

an input control panel for inputting control values to adjust said registration discrepancy on said monitor; and a control unit, coupled with said switch units, said variable delay units and said interpolation processing units, for controlling said switch units, said variable delay units and said interpolation processing units so as to correct said registration discrepancy displayed on said monitor based on said inputted control values from said input control panel.

* * * * *